United States Patent
Schmuck

[15] 3,637,225
[45] Jan. 25, 1972

[54] ARRANGEMENT OF TOOL SHANK FOR ENGAGEMENT WITHIN TOOL HOLDER

[72] Inventor: Peter Schmuck, Mauren, Liechtenstein
[73] Assignee: Hilti Aktiengesellschaft, Furstentum, Liechtenstein
[22] Filed: Apr. 3, 1969
[21] Appl. No.: 813,256

[30] Foreign Application Priority Data
Apr. 10, 1968 Germany...................P 17 52 155.0

[52] U.S. Cl.................................279/81, 279/82, 287/52.05
[51] Int. Cl.........................................................B23b 31/10
[58] Field of Search....................279/81, 82, 80, 87, 75, 72, 279/76, 83; 287/53 LK, 52.05

[56] References Cited

UNITED STATES PATENTS

| 2,332,270 | 10/1943 | Shaw | 287/52.05 |
| 2,807,485 | 9/1957 | Seibert | 287/52.05 |
| 3,421,783 | 1/1969 | Sakai | 287/52.05 |

FOREIGN PATENTS OR APPLICATIONS

| 435,284 | 1926 | Germany | 287/52.05 |
| 668,864 | 1952 | Great Britain | 287/52.05 |

Primary Examiner—Andrew R. Juhasz
Attorney—McGlew and Toren

[57] ABSTRACT

In a tool to be secured within a toolholder by means of cylindrical locking elements engaged within a groove in the shank of the tool, the optimum dimensions of the groove are based on the correlation of the size of the groove with the dimensions of the locking elements and the diameter of the shank.

3 Claims, 2 Drawing Figures

PATENTED JAN25 1972  3,637,225

INVENTOR
PETER TAMM...
BY McGlew and Toren
ATTORNEYS

ARRANGEMENT OF TOOL SHANK FOR ENGAGEMENT WITHIN TOOL HOLDER

SUMMARY OF THE INVENTION

The present invention is directed to the securement of a tool within a toolholder, such as in a hammer drill and the like, and more particularly, it concerns the optimum dimensions of a groove formed in the shank of the tool and arranged to receive a cylindrical locking element for securing the tool in the tool holder against rotation or displacement.

The invention concerns a tool and toolholder arrangement of the type disclosed in the U.S. Pat. Ser. No. 3,536,335 issued Oct. 27, 1970. The above-mentioned copending patent application relates to the arrangement of a tool having oblong grooves in the tool shank and arranged to receive cylindrical locking elements mounted within the toolholder. In such an arrangement one of the problems faced is to provide a good transmission of force between the toolholder and the tool and also to avoid excessive wear during operation.

The primary object of the present invention is to provide an arrangement of the groove within the shank of the tool which, in engagement with the locking element of the toolholder, affords optimum operating conditions and minimum wear of the engaged parts.

Another object of the invention is to correlate the size of the groove with the dimensions of the locking elements and the diameter of the shank to provide the most advantageous engagement of the tool within the toolholder.

Therefore, in accordance with the present invention the radius of the groove or grooves within the tool shank are formed in relationship to a unit diameter of the shank so that the radius of the groove is approximately 0.2 to 0.4 of the diameter of the shank. Moreover, the ratio of the radius of the groove to the radius of the cylindrical locking elements should be one or slightly greater than one.

If the radius of the groove is smaller than 0.2 of the shank diameter, there is considerable danger of shearing of the cylindrical locking elements. On the other hand, if the radius of the groove is more than 0.4 of the diameter of the shank, a wedge effect may develop between the cylindrical locking element and the groove. If the radius of the groove is smaller than the radius of the locking element, a poor engagement of the locking elements within the groove in the tool shank results. However, it is also disadvantageous if the radius of the groove is considerably greater than the radius of the cylindrical locking elements, since considerable wear will develop under such circumstances.

Further, the maximum depth of the grooves in the shank of the tool referred to a unit diameter of the shank, is about 0.1 to about 0.25, or preferably 0.12 to 0.20 of the diameter. Basically, the smaller depth of the groove is used for the smaller groove radius and the greater groove depth for larger groove radius.

If the maximum groove depth is less than 0.1 of the diameter there is considerable danger that the locking element will slip out of the groove. On the other hand, if the groove depth is greater than 0.25 of the diameter of the shank there will be a disadvantageous reduction in the cross section of the shank in the region of the grooves.

In accordance with the invention, another consideration regarding the dimensions of the groove is the length of the groove relative to the length of the locking element. The groove should be between 5 to 20 percent greater than the length of the cylindrical locking elements and preferably the groove should be about 10 to 15 percent greater in length. Where the grooves are less than 5 percent longer than the locking elements a reliable engagement is not assured, and further, the end wear on the tool shank within the groove is too great. Where the length of the groove relative to the length of the locking element is excessive, that is, greater than 20 percent longer than the locking element, too much play develops and this is disadvantageous in the operation of the device incorporating the tool.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
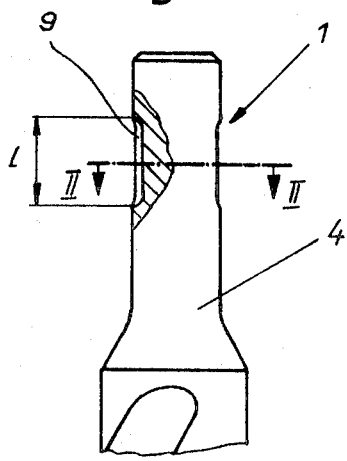
FIG. 1 is a partial longitudinal view of a tool shank having grooves in accordance with the present invention.

In FIG. 1 a tool 1 is illustrated having a shank 4 arranged to be inserted into locked engagement within a toolholder, not shown. The positive connection between the tool and the toolholder is provided by cylindrical locking elements, not shown, in the toolholder. By rotating or displacing an actuating member at least one cylindrically shaped locking element can be operatively engaged into the shank of a tool. In the cylindrical surface of the shank 4 grooves 9 are provided to receive the cylindrical locking elements. In a preferred embodiment of the arrangement the cylindrical locking elements have a length of approximately 1 ½ times the diameter of the tool shank. The length of the grooves in the axial direction of the shank, is 12 percent greater than the length of the locking elements.

Figure 2:
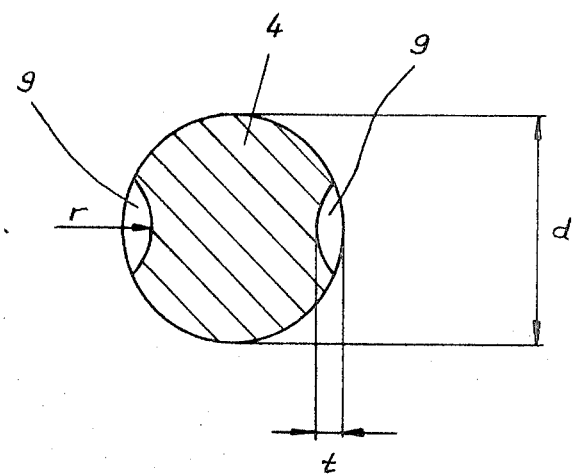
FIG. 2 is a transverse section of the tool shank taken along the line II—II in FIG. 1.

In FIG. 2 a transverse section of the tool shank 4 is shown with a pair of grooves arranged in diametrically opposed positions on the periphery of the shank. If the diameter $d$ of the shank is assumed to have a unit dimension the radius $r$ of the grooves 9, in the preferred embodiment, has a radius of 0.35 with respect to the diameter. The maximum depth of the groove within the body of the shank is 0.15 of the diameter. Further, the radius of the locking elements, not shown, in the embodiment described is also equal to 0.35 of the diameter of the tool shank.

I claim:

1. A tool for use in a toolholder of a hammer drill and the like whereby rotation or axial movement of an actuating member on the toolholder at least one cylindrically shaped locking element in the toolholder can be operatively engaged within an arcuately shaped groove in the shank of the tool for securing the tool and toolholder together against relative rotation and displacement, wherein the improvement comprises that said groove in the tool is closed at its ends for preventing axial displacement of the cylindrically shaped locking element from said groove and said groove having a radius in a plane transverse to the axis of the shank of the tool in the range of approximately 0.20 to 0.40 of the diameter of the shank, with the maximum depth of said groove into the shank being less than the radius of said groove and being in the range of 0.1 to 0.25 of the diameter of the shank.

2. A tool for use in a toolholder of a hammer drill and the like whereby rotation or displacement of an actuating member in the toolholder at least one cylindrically shaped locking element in the toolholder can be operatively engaged within an axially elongated groove in the shank of the tool for securing the tool and toolholder together against relative rotation and displacement, wherein the improvement comprises that said groove in the tool is closed at its ends preventing axial displacement of said cylindrically shaped locking element from said groove and said groove having a radius of approximately 0.20 to 0.40 of the diameter of the shank, the maximum depth of said groove into the surface of said shank being less than the radius of said groove and being in the range of approximately 0.1 to 0.25 of the diameter of the shank, and the length of said groove in the axial direction of said shank being in the range of 1.57 to 1.80 times the diameter of the shank.

3. A tool, as set forth in claim 1, wherein the range of the radius of said groove is between 0.25 to 0.35 of the diameter of the shank.

* * * * *